(12) United States Patent
Xia et al.

(10) Patent No.: US 11,316,925 B2
(45) Date of Patent: Apr. 26, 2022

(54) VIDEO DATA STORAGE METHOD AND DEVICE IN CLOUD STORAGE SYSTEM

(71) Applicant: HANGZHOU HIKVISION SYSTEM TECHNOLOGY CO., LTD., Hangzhou (CN)

(72) Inventors: Weiqiang Xia, Hangzhou (CN); Weichun Wang, Hangzhou (CN); Qiqian Lin, Hangzhou (CN); Wei Wang, Hangzhou (CN)

(73) Assignee: Hangzhou Hikvision System Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/251,326

(22) PCT Filed: Mar. 7, 2019

(86) PCT No.: PCT/CN2019/077349
§ 371 (c)(1),
(2) Date: Dec. 11, 2020

(87) PCT Pub. No.: WO2019/237774
PCT Pub. Date: Dec. 19, 2019

(65) Prior Publication Data
US 2021/0250404 A1    Aug. 12, 2021

(30) Foreign Application Priority Data
Jun. 13, 2018    (CN) .......................... 201810609979.0

(51) Int. Cl.
*H04L 67/1097*    (2022.01)
*G06F 21/44*    (2013.01)
(Continued)

(52) U.S. Cl.
CPC ........ *H04L 67/1097* (2013.01); *G06F 3/0619* (2013.01); *G06F 21/44* (2013.01);
(Continued)

(58) Field of Classification Search
CPC ............ H03M 13/616; H03M 13/1515; H03M 13/3761; H04L 67/1097; H04L 67/1008;
(Continued)

(56) References Cited

U.S. PATENT DOCUMENTS

| 8,788,913 B1 | 7/2014 | Xin et al. |
| 2005/5226331 | 10/2005 | Mohamed |
| 2017/0153937 A1* | 6/2017 | Leggette ............. H03M 13/616 |

FOREIGN PATENT DOCUMENTS

| CN | 102752402 | 10/2012 |
| CN | 103970487 | 8/2014 |

(Continued)

OTHER PUBLICATIONS

First Office Action issued in corresponding Chinese Application No. 201810609979, dated Apr. 15, 2020.
(Continued)

*Primary Examiner* — Kyung H Shin
(74) *Attorney, Agent, or Firm* — Meunier Carlin & Curfman LLC

(57) ABSTRACT

Embodiments of the present application provide a method for storing video data in the cloud storage system, which includes: receiving to-be-stored video data; obtaining identification information of a storage object corresponding to the to-be-stored video data; determining the storage object corresponding to the to-be-stored video data, and a first data security level and a second data security level corresponding to the storage object based on the identification information; wherein, the first data security level is higher than the second data security level; for each frame in the to-be-stored video data, determining whether the frame is a key frame; and storing the frame into the determined storage object based on the first data security level when the frame is the key frame and storing the frame into the determined storage object based on the second data security level when the
(Continued)

frame is not the key frame. With the method for storing video data, the key frame in the video data is protected and the risk of losing video data is reduced.

10 Claims, 4 Drawing Sheets

(51) Int. Cl.
 *G06F 21/62* (2013.01)
 *H04L 65/60* (2022.01)
 *G06F 3/06* (2006.01)
 *H03M 13/00* (2006.01)
(52) U.S. Cl.
 CPC ...... *G06F 21/6218* (2013.01); *H03M 13/616* (2013.01); *H04L 65/60* (2013.01)
(58) Field of Classification Search
 CPC ... H04L 67/2823; H04L 12/18; G06F 3/0619; G06F 3/0617; G06F 3/067; G06F 3/0631; G06F 3/0659; G06F 3/064; G06F 3/0611; G06F 3/0635; G06F 11/1092; G06F 11/1076; G06F 16/258
 See application file for complete search history.

(56) References Cited

FOREIGN PATENT DOCUMENTS

| CN | 105227991 | 1/2016 |
|---|---|---|
| CN | 105338297 | 2/2016 |
| CN | 105611428 | 5/2016 |
| CN | 105959708 | 9/2016 |
| CN | 106713940 | 5/2017 |
| CN | 107229423 | 10/2017 |
| CN | 108229423 | 6/2018 |
| WO | 2017020737 A1 | 9/2017 |

OTHER PUBLICATIONS

Data Security Comparison between Raid5 and Raid6, Sep. 17, 2012, https://blog.51cto.com/ashly/994855.
International Search Report and Written Opinion issued for Application No. PCT/CN2019/077349, dated Jun. 11, 2019.
Extended Search Report issued in corresponding European Application No. 19818774.2 dated Jun. 10, 2021.

* cited by examiner

VIDEO DATA STORAGE METHOD AND DEVICE IN CLOUD STORAGE SYSTEM

The application claims the priority to a Chinese patent application No. 201810609979.0, filed with the China National Intellectual Property Administration on Jun. 13, 2018 and entitled "Method and Apparatus for Storing Video Data in Cloud Storage System", which is incorporated herein by reference in its entirety.

TECHNICAL FIELD

The present application relates to the field of the video cloud storage technology, and in particular to a method and apparatus for storing video data in a cloud storage system.

BACKGROUND

A cloud storage system may associate a large number of different types of storage devices in network through application software to work cooperatively to provide data storage services. In the cloud storage system, a RAID (Redundant Array of Independent Disks) technology is usually used for data storage.

Specifically, a data storage scheme using the RAID technology may include: performing redundancy processing on to-be-stored data to obtain redundant data, and storing the to-be-stored data and the redundant data in a plurality of disks, respectively. In this way, even if data in a certain disk is lost due to the failure of the disk, the lost data can be stilled restored by data stored in other disks.

The video data can be stored by the above storage scheme. However, compared with other data, the video data has special characteristics.

Generally, a piece of video data includes multiple GOPs (Group of Pictures), and each GOP is composed of multiple video frames, including one key frame. If a key frame in a GOP is damaged, the entire GOP will not be able to be played. In the above storage scheme, there is no targeted protection for the key frame in the video data. Therefore, in the case that the video data is stored by the scheme, the key frame in the video data is not secured enough.

SUMMARY

An object of embodiments of the present application is to provide a method, an apparatus, and an electronic device for improving security of video data in a cloud storage system to protect the key frame in the video data, improving the security of data storage.

An embodiment of the present application provides a method for storing video data in a cloud storage system, including:

receiving to-be-stored video data;

obtaining identification information of a storage object corresponding to the to-be-stored video data;

determining the storage object corresponding to the to-be-stored video data, and a first data security level and a second data security level corresponding to the storage object based on the identification information; wherein, the first data security level is higher than the second data security level;

for each frame in the to-be-stored video data, determining whether the frame is a key frame; and storing the frame into the determined storage object based on the first data security level when the frame is the key frame; and storing the frame into the determined storage object based on the second data security level when the frame is not the key frame.

Optionally, storing the frame into the determined storage object based on the first data security level when the frame is the key frame and storing the frame into the determined storage object based on the second data security level when the frame is not the key frame includes:

when the frame is the key frame, determining a first erasure code policy based on the first data security level, and storing the frame into the determined storage object based on the first erasure code policy; and when the frame is not the key frame, determining a second erasure code policy based on the second data security level, and storing the frame into the determined storage object based on the second erasure code policy.

Optionally, the first data security level is a number N1 of first original segments and a number M1 of first redundant segments; the second data security level is a number N2 of second original segments and a number M2 of second redundant segments; the number M1 of first redundant segments is larger than the number M2 of second redundant segments;

storing the frame into the determined storage object based on the first erasure code policy includes:

for each key frame in the to-be-stored video data, dividing the key frame into N1 first original segments, and performing redundancy processing on the N1 first original segments to obtain M1 first redundant segments, and storing the N1 first original segments and the M1 first redundant segments into the determined storage object;

storing the frame into the determined storage object based on the second erasure code policy includes:

for each non-key frame in the to-be-stored video data, dividing the non-key frame into N2 second original segments, and performing redundancy processing on the N2 second original segments to obtain M2 second redundant segments, and storing the N2 second original segments and the M2 second redundant segments into the determined storage object.

Optionally, before receiving the to-be-stored video data, the method further includes:

creating the storage object, wherein, the storage object includes a plurality of disks, and the plurality of disks belong to one or more storage nodes;

storing the N1 first original segments and the M1 first redundant segments into the determined storage object includes:

storing the N1 first original segments and the M1 first redundant segments into different disks in the determined storage object, respectively;

storing the N2 second original segments and the M2 second redundant segments into the determined storage object includes:

storing the N2 second original segments and the M2 second redundant segments into different disks in the determined storage object, respectively.

Optionally, after storing the N1 first original segments and the M1 first redundant segments into the different disks in the determined storage object, respectively, the method further includes:

recording index information corresponding to the frame, wherein the index information includes information indicative of the storage object and the disk that store each of the first original segments and the first redundant segments;

after storing the N2 second original segments and the M2 second redundant segments into the different disks in the determined storage object, respectively, the method further includes:

recording index information corresponding to the frame, wherein the index information includes information indicative of the storage object and the disk that store each of the second original segment and the second redundant segments.

An embodiment of the present application provides an apparatus for storing video data in a cloud storage system, including: a video access module and a coding module, wherein, the video access module includes: a data receiving sub-module, an information obtaining sub-module, a storage information determining sub-module, and a frame analyzing sub-module.

The data receiving sub-module is configured for receiving to-be-stored video data.

The information obtaining sub-module is configured for obtaining identification information of a storage object corresponding to the to-be-stored video data.

The storage information determining sub-module is configured for determining the storage object corresponding to the to-be-stored video data, and a first data security level and a second data security level corresponding to the storage object based on the identification information; wherein, the first data security level is higher than the second data security level.

The frame analyzing sub-module is configured for, for each frame in the to-be-stored video data, determining whether the frame is a key frame.

The coding module is configured for storing the frame into the determined storage object based on the first data security level when the frame is the key frame; and storing the frame into the determined storage object based on the second data security level when the frame is not the key frame.

Optionally, the coding module is further configured for:

when the frame is the key frame, determining a first erasure code policy based on the first data security level, and storing the frame into the determined storage object based on the first erasure code policy; and when the frame is not the key frame, determining a second erasure code policy based on the second data security level, and storing the frame into the determined storage object based on the second erasure code policy.

Optionally, the first data security level is a number N1 of first original segments and a number M1 of first redundant segments; the second data security level is a number N2 of second original segments and a number M2 of second redundant segments; the number M1 of first redundant segments is larger than the number M2 of second redundant segments;

the coding module includes:

a dividing sub-module configured for dividing each key frame in the to-be-stored video data into N1 first original segments, and dividing each non-key frame in the to-be-stored video data into N2 second original segments;

a redundancy processing sub-module configured for performing redundancy processing on the N1 first original segments to obtain M1 first redundant segments, and performing redundancy processing on the N2 second original segments to obtain M2 second redundant segments;

a storage sub-module configured for storing the N1 first original segments and the M1 first redundant segments into the determined storage object, and storing the N2 second original segments and the M2 second redundant segments into the determined storage object.

Optionally, the apparatus further includes:

a storage object creating module configured for creating the storage object, wherein, the storage object includes a plurality of disks, and the plurality of disks belong to one or more storage nodes;

the storage sub-module is further configured for:

storing the N1 first original segments and the M1 first redundant segments into different disks in the determined storage object, respectively, and storing the N2 second original segments and the M2 second redundant segments into different disks in the determined storage object, respectively.

Optionally, the apparatus further includes:

an index creating module configured for recording index information corresponding to each frame in the to-be-stored video data, wherein the index information includes information indicative of the storage object and the disk that store each of the first original segments and the first redundant segments or information indicative of the storage object and the disk that store each of the second original segment and the second redundant segments.

An embodiment of the present application further provides an electronic device, including a processor, a communication interface, a memory, and a communication bus, wherein, the processor, the communication interface, and the memory communicate with each other through the communication bus.

The memory is configured for storing a computer programs.

The processor is configured for executing the program stored on the memory to carry out any one of the above methods for storing video data in the cloud storage system.

An embodiment of the present application further provides a computer-readable storage medium having stored therein a computer program, wherein the computer program is executed by a processor, so as to cause the processor to perform any one of the above methods for storing video data in the cloud storage system.

In the method and the apparatus for storing video data in the cloud storage system according to the embodiments of the present application, during the cloud storage of the video data, a key frame in the to-be-stored video data is stored based on the first data security level that is a higher data security level, and a non-key frame in the to-be-stored video data is stored based on the second data security level that is a lower data security level, which causes that the key frame corresponds to the higher data security level, and thus protects the key frame in the video data and improves the security of the data storage.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION

Figure 1:
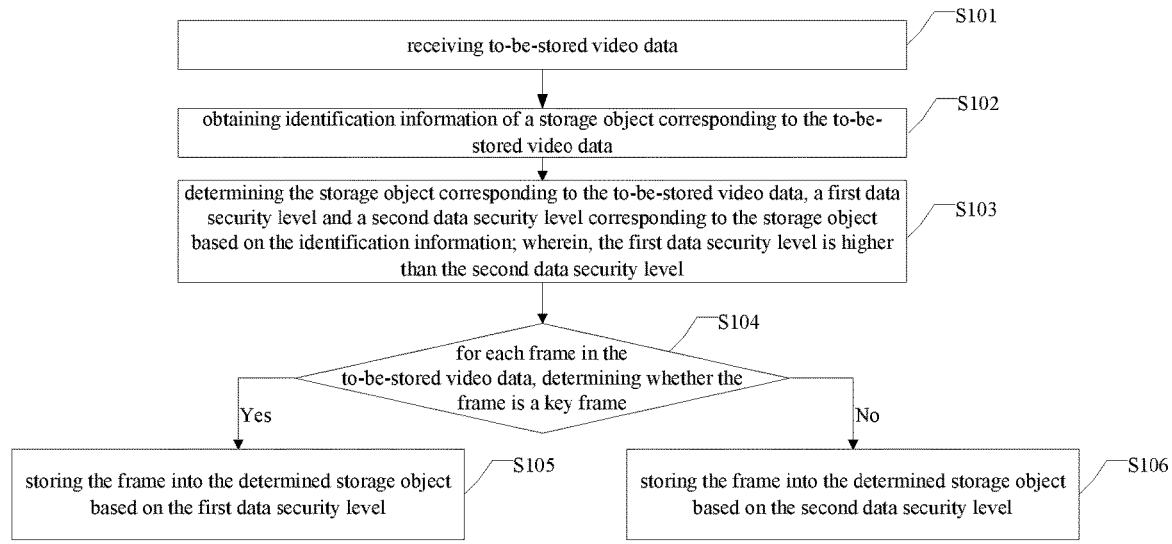
FIG. 1 is a flowchart of a method for storing video data in a cloud storage system according to an embodiment of the present application.

The technical solutions in the embodiments of the present application will be described clearly and completely in conjunction with the accompanying drawings in the embodiments of the present application. Obviously, the described embodiments are only some, and not all, of the embodiments of the present application. All other embodiments obtained based on the embodiments of the present application by those skilled in the art without any creative efforts fall into the scope of protection defined by the present application.

Each piece of video data is composed of a plurality of video frames. Each piece of video data includes one key frame. If a key frame in a certain piece of video data is damaged, then the video data cannot be played. However, in the prior art, a key frame in the video data is not protected when a cloud storage system stores video data. Therefore, there is a huge risk of losing video data. To solve the above technical problem, an embodiment of the present application provides a method and apparatus for storing video data in the cloud storage system.

Generally, a cloud storage system includes a plurality of storage nodes. Each of the storage nodes may obtain and store to-be-stored video data. Each of the storage nodes also have a certain number of disks, which may provide a certain storage space. For example, a storage node may be a storage server or the like. A storage node in the cloud storage system may perform a method for storing video data according to the embodiment of the present application to store the obtained to-be-stored video data. In some cases, the disks in a storage node may be virtualized into one or more resource pools. The resource pools may be considered as storage objects. Each of the resource pools may include one or more disks. These disks may be from the same storage node or different storage nodes. In this way, the storage node can perform a method for storing video data according to the embodiment of the present application to store the to-be-stored video data into a certain resource pool.

The method for storing video data according to the embodiment of the present application is generally described below, and includes:

receiving to-be-stored video data;

obtaining identification information of a storage object corresponding to the to-be-stored video data;

determining the storage object corresponding to the to-be-stored video data, and a first data security level and a second data security level corresponding to the storage object based on the identification information; wherein, the first data security level is higher than the second data security level;

for each frame in the to-be-stored video data, determining whether the frame is a key frame; and when the frame is the key frame, storing the frame into the determined storage object based on the first data security level, and when the frame is not the key frame, storing the frame into the determined storage object based on the second data security level.

As mentioned above, in the cloud storage of the video data by the method for storing video data in the cloud storage system according to the embodiment of the present application, a key frame in the to-be-stored video data is stored based on the first data security level which is a higher data security level, while a non-key frame in the to-be-stored video data is stored based on the second data security level which is a lower data security level, which causes the key frame to correspond to the higher data security level, and thus protects the key frame in the video data and improves the security of the data storage.

The method for storing video data according to the embodiment of the present application is described in detail below through embodiments.

FIG. 1 is a flowchart of a method for storing video data in a cloud storage system according to an embodiment of the present application, which includes the following steps.

At step S101, to-be-stored video data is received.

The cloud storage system may provide access interfaces for multiple different devices. Therefore, in the cloud storage system, a current storage node (execution subject of the method) may obtain to-be-stored video data from different devices. For example, the current storage node (execution subject) may acquire video data by an acquisition device such as an IP Camera, a smart phone and the like, or obtain video data from a storage device such as a server, a client and the like.

Alternatively, the current storage node (execution subject) may further obtain video data from another storage node. For example, a storage node A obtains video data from the IP Camera, and sends the video data to a storage node B. In such way, the storage node B obtains the video data from another storage node. This is not limited in the embodiment of the present application.

In an implementation, the current storage node (execution subject) may first send a data obtaining instruction to the acquisition device, and then the acquisition device returns the to-be-stored video data to the current storage node (execution subject). Alternatively, the acquisition device may periodically send the to-be-stored video data to the current storage node (execution subject). This is not limited specifically herein.

At step S102, identification information of a storage object corresponding to the to-be-stored video data is obtained.

In general, the cloud storage system includes a plurality of storage nodes. Each of the storage nodes may further include a plurality of disks. In the embodiment of the present application, the storage object for storing the to-be-stored video data may be one or more disks in a certain storage node in the cloud storage system, or one or more resource pools. A resource pool refers to a storage space virtualized from a plurality of disks. A plurality of disks included in the same resource pool may be from the same storage node or different storage nodes. This is not limited herein.

In the embodiment of the present application, the to-be-stored video data may be stored in a disk of a storage node for receiving the to-be-stored video data or a disk of other storage nodes, or stored in a resource pool. A plurality of disks included in the resource pool may belong to the current storage node (execution subject) or another storage node, or belong to different storage nodes.

After a storage node in the cloud storage system receives the to-be-stored video data, a management device in the cloud storage system may assign a storage object for the to-be-stored video data, and send identification information of the storage object to the storage node for receiving the to-be-stored video data.

In an implementation, all disks in the cloud storage system are virtualized into a plurality of resource pools. The management device may determine one resource pool randomly as the storage object corresponding to the to-be-stored video data.

Alternatively, in the case that the current storage node (execution subject) acquires the video data via the acquisition device, a correspondence between acquisition devices and resource pools may be preset. After obtaining the to-be-stored video data, the storage node may determine identification information of the acquisition device, for example, an ID of the acquisition device, corresponding to the to-be-stored video data. Then, the storage device searches for the resource pool corresponding to the identification information of the acquisition device based on the preset correspondence between acquisition devices and resource pools. In this way, video data acquired by each of the acquisition devices will be stored in a corresponding resource pool, allowing the more centralized storage of the video data in the cloud storage system, and facilitating a subsequent query and recall by the user.

Alternatively, the corresponding resource pool may be determined based on information such as a file size, a format, and acquisition time of the to-be-stored video data. For example, the to-be-stored video data with a larger file size is stored in a resource pool with a larger storage space; or the format of the to-be-stored video data is classified, and the to-be-stored video data in the same format is stored in the same resource pool; or, the to-be-stored video data acquired during a certain time period is stored in a certain resource pool; or so on. This is not limited in the embodiment of the present application.

At step S103, the storage object corresponding to the to-be-stored video data and a first data security level and a second data security level corresponding to the determined storage object are determined based on the identification information; wherein, the first data security level is higher than the second data security level.

After obtaining the identification information of the storage object corresponding to the to-be-stored video data, the storage node may determine the storage object corresponding to the to-be-stored video data based on the identification information, and further determine the first data security level and the second data security level corresponding to the determined storage object as the first data security level and the second data security level corresponding to the to-be-stored video data. The first data security level is higher than the second data security level. In other words, the video data stored based on the first data security level is safer than the video data stored based on the second data security level, and the possibility of the damage of the video data stored based on the first data security level is lower.

Specifically, the first data security level and the second data security level corresponding to the storage object may be preset for a certain storage object by the user. For example, in an implementation, first, a resource pool needs to be created before the to-be-stored video data is obtained, and then, the first data security level and the second data security level for the resource pool may be set.

Alternatively, the first data security level and the second data security level corresponding to the storage object may be temporarily set for the storage object by the user based on the importance of the to-be-stored video data. For example, in an implementation, the to-be-stored video data is obtained while attribute information corresponding to the to-be-stored video data is obtained. By way of example, the attribute information may be a specific requirement of the data security level when the to-be-stored video data is stored. The attribute information may be also an importance level of the to-be-stored video data. Then, the data security level when the to-be-stored video data is stored is determined based on the correspondence of several data security levels preset in the storage object and the importance level. Further, the first data security level and the second data security level of the storage object are set.

Alternatively, the first data security level and the second data security level corresponding to the storage object may be determined through other implementations. This is not limited in the embodiment of the present application.

At step S104, for each frame in the to-be-stored video data, whether the frame is a key frame is determined; if the frame is the key frame, then step S105 is executed; if the frame is not the key frame, then step S106 is executed.

At step S105, the frame is stored into the determined storage object based on the first data security level.

At step S106, the frame is stored into the determined storage object based on the second data security level.

One piece of video data is composed of a plurality of frames. A plurality of continuous frames form GOP (Group of Pictures). Each GOP may include a key frame and a non-key frame(s). The key frame is an I frame, which is an intra-coded frame. By way of example, a non-frame may include a P frame and a B frame. The P frame is a forward prediction frame, and the B frame is a bi-directional insertion frame. Alternatively, the non-key frame may only include the P frame or the B frame. This is not limited herein. Simply, the I frame is a complete picture, while the P frame and the B frame record a change relative to the I frame. If there is no I frame, the P frame and the B frame are unable to be decoded. Therefore, the importance of the key frame (I frame) is higher than that of the non-key frame. If the key frame in a certain video data damages, then the video data cannot be played.

Accordingly, in an implementation, before storing the to-be-stored video data, the current storage node (execution subject) first determines whether the current frame to be stored is the key frame. If the current frame is the key frame, the frame is stored into the determined storage object based on the first data security level which is a higher security level. If the current frame is not the key frame, the frame is stored into the determined storage object based on the second data security level which is a lower security level.

In another implementation, there is identification information in the to-be-stored video data received by the current storage node (execution subject). The identification information may distinguish the key frame and the non-key frame in the stored video data. Furthermore, the current storage node (execution subject) may further receive the first data security level information corresponding to the key frame and the second data security level information corresponding to the non-key frame. In this way, the key frame may be stored in the determined storage object based on the first data security level, and the non-key frame is stored in the determined storage object based on the second data security level. Alternatively, the current storage node (execution subject) may send the key frame and the non-key frame in to-be-stored video data and the corresponding first data security level and second data security level to other storage nodes for coding and storage. In this way, each storage node in the cloud storage system can be used effectively, improving storage effectiveness of the cloud storage system.

By way of example, there may be several methods for storing the key frame and non-key frame in the to-be-stored video data in the determined storage object as follows.

In an implementation, the video data may be stored based on an erasure code policy. A first erasure code policy is determined based on the first data security level, and a second erasure code policy is determined based on the second data security level.

For example, several erasure code policies for different data security levels may be preset, and unique identification information is set for each of the erasure code policies. The first data security level and the second data security level are identification information for the different erasure code policies.

For another example, the first data security level may be the number N1 of first original segments and the number M1 of first redundant segments in the first erasure code policy; the second data security level may be the number N2 of second original segments and the number M2 of second redundant segments in the second erasure code policy.

Those skilled in the art can understand that an erasure code policy generally is that a redundancy processing is performed on the to-be-stored data to obtain redundant data, and the to-be-stored data and the redundant data are respectively stored in a plurality of disks. In this way, in case that data stored in a certain disk is lost due to the failure of the disk, the lost data can be restored by data stored in other disks. Therefore, the more the number of redundant segments in an erasure code policy is, the higher the security level of the erasure code policy is. That is, the larger the ratio between the number of the redundant segments and the number of the original segments is, the higher the security level of the erasure code policy is. In the embodiment, the first data security level is higher than the second data security level. Therefore, the number M1 of first redundant segments is larger than the number M2 of second redundant segments, that is, the value of M1:N1 is larger than the value of M2:N2. By way of example, the first data security level may be represented as N1+M1, e.g., 4+2, and the second data security level may be represented as N2+M2, e.g., 4+1.

For another example, the first data security level may be the number of the redundant segments in the first erasure code policy, and the second data security level may be the number of the redundant segments in the second erasure code policy.

In the implementation, after the first erasure code policy and the second erasure code policy are determined, data of each frame may be stored based on the specific erasure code policy corresponding to the frame.

Specifically, according to the first erasure code policy, the key frame in the to-be-stored video data is divided into N1 first original segments, and then a redundant processing is performed on the N1 first original segments to obtain M1 first redundant segments; then the N1 first original segments and the M1 first redundant segments are stored in the determined storage object. Similarly, according to the second erasure code policy, the non-key frame in the to-be-stored video data is divided into N2 second original segments, and then a redundant processing is performed on the N2 second original segments to obtain M2 second redundant segments; then the N2 second original segments and the M2 second redundant segments are stored in the determined storage object.

For another example, the first data security level and the second data security level may be an identification or a sequence number of an erasure code policy. For example, three erasure code policies are preset, and their identifications are A, B, and C. The data security levels of the three erasure code policies decrease in sequence. The first data security level and the second data security level may be the identifications A, B and C of the three erasure code policies, and so on.

Alternatively, in another implementation, the first data security level and the second data security level may correspond to the number of copies of the video data. Then, the first data security level being higher than the second data security level means that the number of the copies corresponding to the first data security level is larger than the number of the copies corresponding to the second data security level. For example, the number of the copies corresponding to the first data security level may be 2, and the number of the copies corresponding to the second data security level may be 1. Accordingly, during the storage of the video data, the key frame is copied twice to generate 2 copies thereof, and then the key frame and the 2 copies thereof are stored into the corresponding storage object; and the non-key frame is copied once to generate one copy thereof, and then the non-key frame and the one copy thereof are stored into the corresponding storage object. In the implementation, the increase in the number of copies will make the data security level of the key frame higher.

Alternatively, the respective storage of the key frame and the non-key frame in the storage object based on the first data security level and the second data security level may be implemented by other ways, so that the key frame has a higher data security level. This is not limited in the embodiment of the present application.

It can be seen that, in the cloud storage of the video data by the method for storing video data in the cloud storage system according to the embodiment of the present application, a key frame in the to-be-stored video data is stored based on the first data security level that is a higher data security level, and a non-key frame in the to-be-stored video data is stored based on the second data security level that is a lower data security level, which causes that the key frame corresponds to the higher data security level, and thus protects the key frame in the video data and improves the security of the data storage.

Figure 2:
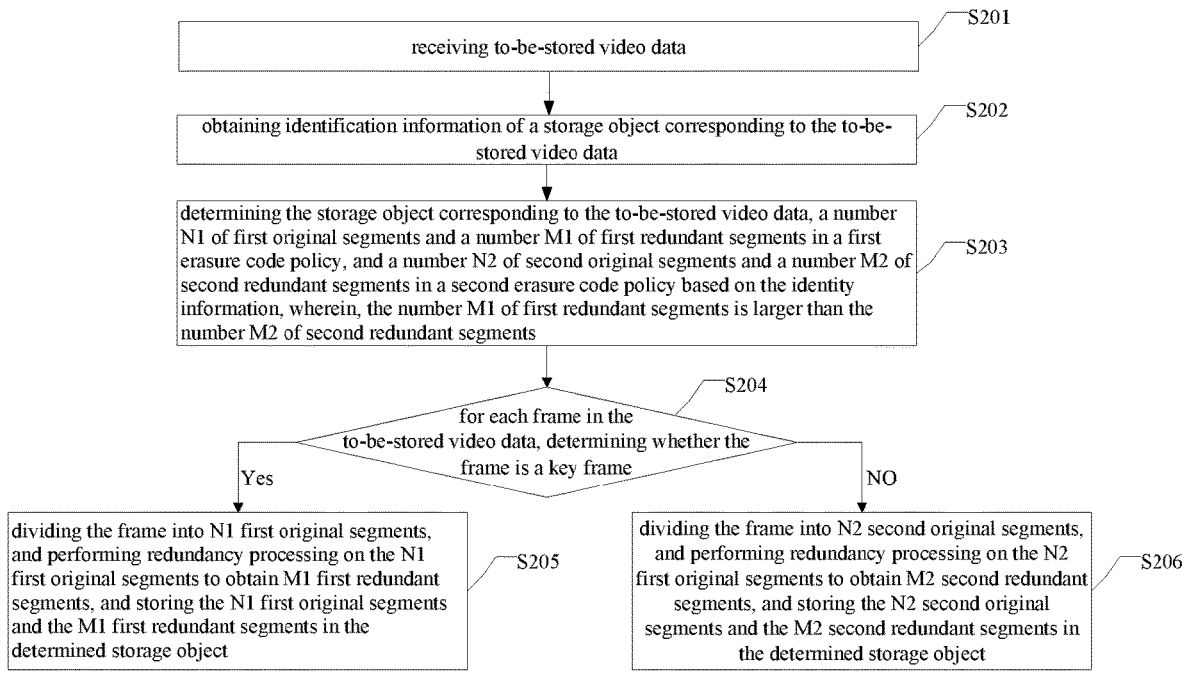
FIG. 2 is another flowchart of a method for storing video data in a cloud storage system according to an embodiment of the present application.

FIG. 2 is a flowchart of another method for storing video data in the cloud storage system according to an embodiment of the present application. The method includes the following steps.

At step S201, to-be-stored video data is received.

The cloud storage system may provide access interfaces for multiple different devices. Therefore, in the cloud storage system, a current storage node (execution subject of the method) may obtain the to-be-stored video data by different devices. For example, the current storage node (execution subject) may acquire video data by an acquisition device such as an IP Camera, a smart phone and the like.

In an implementation, the current storage node (execution subject) sends a data obtaining instruction to an acquisition device, and then the acquisition device returns the to-be-stored video data to the current storage node (execution subject).

In an implementation, before the to-be-stored video data is obtained, a storage object may be created in advance. The storage object may be a resource pool which is a storage space virtualized form some disks. The disks may be from the same storage node or different storage nodes. This is not limited in the embodiment.

At step S202, identification information of a storage object corresponding to the to-be-stored video data is obtained.

In the embodiment of the present application, the to-be-stored video data may be stored in a disk of a storage node receiving the to-be-stored video data, or a disk of other storage nodes. Alternatively, the to-be-stored video data may be stored in a resource pool. A plurality of disks included in the resource pool may all belong to the current storage node (execution subject) or belong to other storage nodes, or belong to different storage nodes.

After a storage node in the cloud storage system receives the to-be-stored video data, a management device in the cloud storage system may assign a corresponding storage object for the to-be-stored video data, and sends the identification information of the storage object to the storage node receiving the to-be-stored video data.

In an implementation, all disks in the cloud storage system are virtualized into a plurality of resource pools. The management device may randomly determine one resource pool as the storage object corresponding to the to-be-stored video data.

Alternatively, in the case that the current storage node (execution subject) acquires the video data via the acquisition device, a correspondence between acquisition devices and resource pools may be preset. After obtaining the to-be-stored video data, the storage node may determine identification information of the acquisition device, for example, an ID of the acquisition device, corresponding to the to-be-stored video data may be determined. Then, the storage node search for the resource pool corresponding to the identification information of the acquisition device based on the correspondence between acquisition devices and resource pools. In this way, the video data acquired by each of the acquisition devices is stored in a corresponding resource pool, causing the more centralized storage of the video data in the cloud storage system and facilitating a subsequent query and recall by the user.

Alternatively, the corresponding resource pool may be determined based on information such as a file size, a format, and acquisition time of the to-be-stored video data. For example, to-be-stored video data with a larger file size is stored in a resource pool with a larger storage space; or the format of the to-be-stored video data is classified, and the to-be-stored video data in the same format is stored in the same resource pool; or, to-be-stored video data acquired during a certain time period is stored in a certain resource pool; and so on. This is not limited in the embodiment of the present application.

At step S203, the storage object corresponding to the to-be-stored video data, a number N1 of first original segments and a number M1 of first redundant segments in a first erasure code policy, and a number N2 of second original segments and a number M2 of second redundant segments in a second erasure code policy are determined based on the identification information, wherein, the number M1 of first redundant segments is larger than the number M2 of second redundant segments.

Those skilled in the art can understand that in general, the more the number of redundant segments in an erasure code policy is, the higher the security level of the erasure code policy is, that is, the larger the ratio between the number of the redundant segments and the number of the original segments is, the higher the security level of the erasure code policy is. In the embodiment, the first data security level is higher than the second data security level. The number M1 of first redundant segments is larger than the number M2 of second redundant segments, that is, the value of M1:N1 is larger than the value of M2:N2. By way of example, the first data security level may be represented as N1+M1, e.g., 4+2, and the second data security level may be represented as N2+M2, e.g., 4+1.

At step S204, for each frame in the to-be-stored video data, whether the frame is a key frame is determined; if the frame is the key frame, then step S205 is executed; if the frame is not the key frame, then step S206 is executed.

At step S205, the frame is divided into N1 first original segments, and then redundancy processing is performed on the N1 first original segments to obtain M1 first redundant segments, and the N1 first original segments and the M1 first redundant segments are stored in the determined storage object.

At step S206, the frame is divided into N2 second original segments, and then redundancy processing is performed on the N2 second original segments to obtain M2 second redundant segments, and the N2 second original segments and the M2 second redundant segments are stored in the determined storage object.

In an implementation, before storing the to-be-stored video data, the current storage node (execution subject) first determines whether the current frame to be stored is the key frame; if the current frame is the key frame, the frame is stored into the determined storage object based on the first data security level which is a higher security level; if the current frame is not the key frame, the frame is stored into the determined storage object based on the second data security level which is a lower security level.

In another implementation, there is identification information in the to-be-stored video data received by the current storage node (execution subject). The identification information may distinguish the key frame and the non-key frame in the to-be-stored video data. Furthermore, the current storage node (execution subject) further receives the first data security level information corresponding to the key frame and the second data security level information corresponding to the non-key frame. In this way, the key frame is stored in the determined storage object based on the first data security level, and the non-key frame is stored in the determined storage object based on the second data security level; or, the current storage node (execution subject) may send the key frame and the non-key frame in the to-be-stored video data and the corresponding first data security level and second data security level to other storage nodes for coding and storage. In this way, each storage node in the cloud storage system can be used effectively, improving storage effectiveness of the cloud storage system.

Further, different segments may be stored in different disks during the process of storing the original segments and the redundant segments of each frame in the to-be-stored video data. According to the descriptions above, if the number of the disks in the storage object is larger than the total number of the original segments and the redundant segments of the frame, then these segments should be stored in different disks; and if the number of the disks in the storage object is smaller than the total number of the original segments and the redundant segments of the frame, then these segments are stored in the disks as evenly as possible. In summary, the current data frame is dispersed as far as possible, so that in case a certain disk in the storage object is damaged, the number of damaged original segments or the redundant segments is minimized, which causes minimum loss for the to-be-stored video data.

In an implementation, for each frame in the to-be-stored video data, after the original segments and the redundant segments corresponding to the frame are stored in different disks, the current storage node (execution subject) may further record index information corresponding to the frame. The index information includes information about the storage object storing each original segment and redundant segment. The index information can facilitate a subsequent query or download by a user.

For example, there are 4 original segments and 2 redundant segments in the erasure code policy corresponding to the current frame. In storing the current frame, the current frame is divided into 4 original segments and 2 redundant segments are obtained. These 6 data segments (4 original segments and 2 redundant segments) may be respectively represented by A1, A2, A3, A4, A5, and A6. If the number of the disks in the storage object is larger than the total number of the original segments and the redundant segments of the frame, then the 6 data segments of the current frame are stored into 6 different disks. The storage object may be represented by B0, and the 6 disks may be represented by B1, B2, B3, B4, B5, and B6.

Specifically, it is assumed that the data segment A1 is stored into the disk B1, the data segment A2 is stored into the disk B2, the data segment A3 is stored into the disk B3, the data segment A4 is stored into the disk B4, the data segment A5 is stored into the disk B5, and the data segment A6 is stored into the disk B6. Then, the index information corresponding to the frame is A1-B1、A2-B2、A3-B3、A4-B4、A5-B5、A6-B6. Meanwhile, the index information may further include the storage object B0. That is, the index information may be A1-B0-B1、A2-B0-B2、A3-B0-B3、A4-B0-B4、A5-B0-B5、A6-B0-B6.

Alternatively, the original segments and the redundant segments may be further identified and distinguished in the index information. It is not limited in the embodiment of the present application.

It can be seen that, in the cloud storage of the video data by the method for storing video data in the cloud storage system according to the embodiment of the present application, a key frame in the to-be-stored video data is stored based on the first data security level that is a higher data security level, and a non-key frame in the to-be-stored video data is stored based on the second data security level that is a lower data security level, which causes that the key frame corresponds to the higher data security level, and thus protects the key frame in the video data and improves the security of the data storage.

Figure 3:
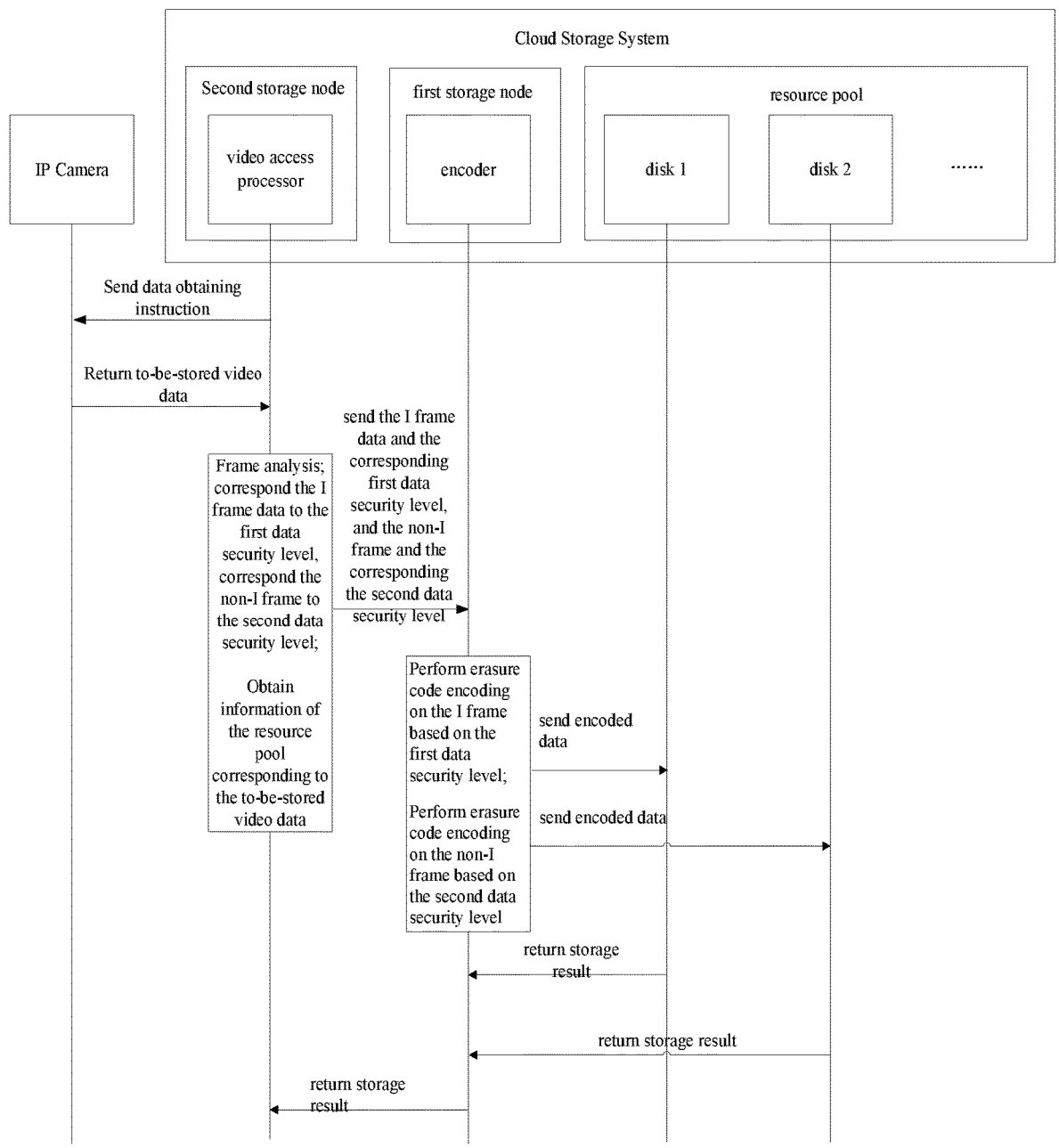
FIG. 3 is a sequence diagram of the method for storing video data in the cloud storage system according to an embodiment of the present application in an implementation.

FIG. 3 is a sequence diagram of storing the to-be-stored video data by the method for storing video data in the cloud storage system according to the embodiment of the present application, in an implementation. In FIG. 3, the cloud storage system includes a plurality of storage nodes. The storage nodes include devices such as a video access processor and an encoder, and further include some disks. These disks may provide some storage space. The storage space in the storage node may be virtualized into one or more resource pools. Each resource pool includes a plurality of disks. The cloud storage system communicates with IPC (IP Camera), and provides data storage service to IPC.

In the embodiment, firstly, the video access processor in the current storage node (execution subject) obtains the to-be-stored video data from IPC. Specifically, the video access processor first sends a data obtaining instruction to IPC, and then, receives data returned from IPC as the to-be-stored video data.

Then, the video access processor determines information about the resource pool corresponding to the to-be-stored video data and the preset first data security level and second data security level corresponding to the resource pool. Meanwhile, the video access processor analyzes the to-be-stored video data, i.e., determines whether each frame in the to-be-stored video data is an I frame or a non-I frame, corresponds the I frame to the first data security level and the non-I frame to the second data security level, and sends the frames and their corresponding security level information to the encoder. Specifically, the data security level information may be the number of the original segments and the number of the redundant segments in the erasure code policy.

Next, the encoder in the current storage node (execution subject) performs EC (erasure code) encoding on each frame in the to-be-stored video data based on the determined data security level, and sends the encoded data to different disks in the determined resource pool.

Furthermore, the disks may return storage results to the video encoder, and then the video encoder returns the results to the video access processor. Specifically, the video access processor may generate the index information based on the received storage results. Information about the resource pool and the disks storing the original segments and the redundant segments of each frame in the to-be-stored video data is recorded in the index information.

Figure 4:
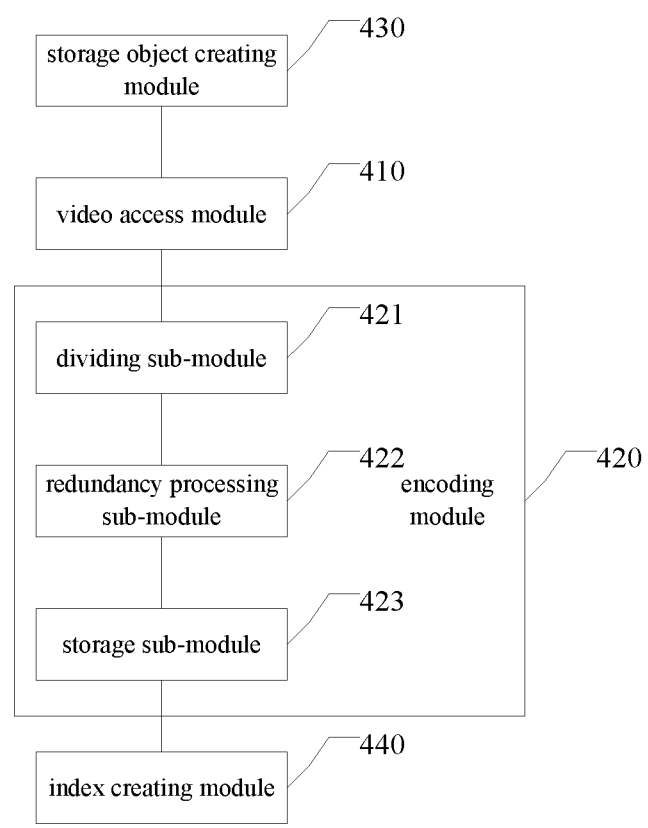
FIG. 4 is a structural diagram of an apparatus for storing video data in a cloud storage system according to an embodiment of the application.

FIG. 4 is a structural diagram of an apparatus for storing video data in a cloud storage system according to an embodiment of the application. The apparatus includes a video access module 410 and a coding module 420.

The video access module 410 includes a data receiving sub-module, an information obtaining sub-module, a storage information determining sub-module, and a frame analyzing sub-module.

The data receiving sub-module is configured for receiving to-be-stored video data.

The information obtaining sub-module is configured for obtaining identification information of a storage object corresponding to the to-be-stored video data.

The storage information determining sub-module is configured for determining the storage object corresponding to the to-be-stored video data, and a first data security level and a second data security level corresponding to the storage object based on the identification information; wherein, the first data security level is higher than the second data security level.

The frame analyzing sub-module is configured for, for each frame in the to-be-stored video data, determining whether the frame is a key frame; and further configured for triggering an coding module 420.

The coding module 420 is configured for storing the frame into the determined storage object based on the first data security level when the frame is the key frame; and storing the frame into the determined storage object based on the second data security level when the frame is not the key frame.

In the embodiment, the coding module 420 is specifically configured for: when the frame is the key frame, determining a first erasure code policy based on the first data security level, and storing the frame into the determined storage object based on the first erasure code policy; and when the frame is not the key frame, determining a second erasure code policy based on the second data security level, and storing the frame into the determined storage object based on the second erasure code policy.

In an implementation, the first data security level is a number N1 of first original segments and a number M1 of first redundant segments. The second data security level is a number N2 of second original segments and a number M2 of second redundant segments. M1 in the first data security level is larger than M2 in the second data security level. The coding module 420 may include a dividing sub-module 421, a redundancy processing sub-module 422 and a storage sub-module 423.

The dividing sub-module 421 is configured for dividing each key frame in the to-be-stored video data into N1 first original segments, and dividing each non-key frame in the to-be-stored video data into N2 second original segments.

The redundancy processing sub-module 422 is configured for performing redundancy processing on the N1 first original segments to obtain M1 first redundant segments, and performing the redundancy processing on the N2 second original segments to obtain M2 second redundant segments.

The storage sub-module 423 is configured for storing the N1 first original segments and the M1 first redundant segments into the determined storage object, and storing the N2 second original segments and the M2 second redundant segments into the determined storage object.

In the embodiment, the apparatus further includes:

a storage object creating module 430 configured for creating the storage object, wherein, the storage object includes a plurality of disks, and the plurality of disks belong to one or more storage nodes.

The storage sub-module is specifically configured for:

storing the N1 first original segments and the M1 first redundant segments into different disks in the determined storage object, respectively, and storing the N2 second original segments and the M2 second redundant segments into different disks in the determined storage object, respectively.

In the embodiment of the present application, the apparatus further includes:

an index creating module 440 configured for recording index information corresponding to each frame in the to-be-stored video data, wherein the index information includes information indicative of the storage object and the disk that store each of the first original segments and the first redundant segments or information indicative of the storage object and the disk that store each of the second original segment and the second redundant segments.

It can be seen that, during the cloud storage of the video data by the method for storing video data in the cloud storage system according to the embodiment of the present application, a key frame in the to-be-stored video data is stored based on the first data security level that is a higher data security level, and a non-key frame in the to-be-stored video data is stored based on the second data security level that is a lower data security level, which causes that the key frame corresponds to the higher data security level, and thus protects the key frame in the video data and improves the security of the data storage.

Figure 5:
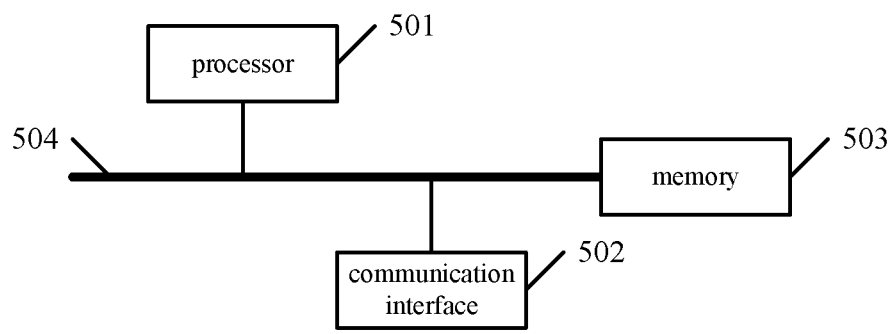
FIG. 5 is a diagram of an electronic device according to an embodiment of the application.

An embodiment of the present application further provides an electronic device. As shown in FIG. 5, the electronic device includes a processor 501, a communication interface 502, a memory 503, and a communication bus 504. The processor 501, the communication interface 502, and the memory 503 communicate with each other through the communication bus 504.

The memory 503 is configured for storing a computer program.

The processor 501 is configured for executing the program stored on the memory 503 to carry out the following steps:

receiving to-be-stored video data;

obtaining identification information of a storage object corresponding to the to-be-stored video data;

determining the storage object corresponding to the to-be-stored video data, and a first data security level and a second data security level corresponding to the storage object based on the identification information; wherein, the first data security level is higher than the second data security level;

for each frame in the to-be-stored video data, determining whether the frame is a key frame; and storing the frame into the determined storage object based on the first data security level when the frame is the key frame and storing the frame into the determined storage object based on the second data security level when the frame is not the key frame.

The communication bus mentioned in the above electronic device may be a Peripheral Component Interconnect (PCI) bus or an Extended Industry Standard Architecture (EISA) bus. The communication bus may include an address bus, a data bus, a control bus, etc. For ease of representation, only one thick line is used in the figure, but it does not mean that there is only one bus or one type of bus.

The communication interface is used for communication between the electronic device and other devices.

The memory may include Random Access Memory (RAM), and may further include Non-Volatile Memory (NVM), for example, at least one disk memory. Optionally, the memory may further be at least one storage device located away from the processor.

The processor may be a general-purpose processor, including a Central Processing Unit (CPU), a Network Processor (NP), etc.; it may further be a Digital Signal Processor (DSP), an Application Specific Integrated Circuit (ASIC), Field-Programmable Gate Array (FPGA) or other programmable logic devices, discrete gates or transistor logic devices, discrete hardware components.

It can be seen that, during the cloud storage of the video data by the method for storing video data in the cloud storage system according to the embodiment of the present application, a key frame in the to-be-stored video data is stored based on the first data security level that is a higher data security level, and a non-key frame in the to-be-stored video data is stored based on the second data security level that is a lower data security level, which causes that the key frame corresponds to the higher data security level, and thus protects the key frame in the video data and improves the security of the data storage.

Another embodiment of the present application further provides a computer-readable storage medium having stored therein instructions which, when executed on a computer, cause the computer to perform a method for storing video data in the cloud storage system according to any one of the embodiments.

In the embodiments, it may be implemented in whole or in part by software, hardware, firmware, or any combination thereof. When implemented by software, it may be implemented in the form of a computer program product in whole or in part. The computer program product includes one or more computer instructions. When the computer program instructions are loaded and executed on the computer, all or part of the processes or functions described in the embodiments of the present application are generated. The computer may be a general-purpose computer, a dedicated computer, a computer network, or other programmable devices. The computer instructions may be stored in a computer-readable storage medium or transmitted from one computer-readable storage medium to another computer-readable storage medium. For example, the computer instructions may be transmitted from a website, computer, server, or data center to another website, computer, server or data center in a wired (such as coaxial cable, optical fiber, Digital Subscriber Line (DSL)) or wireless (such as infrared, wireless, microwave, etc.) manner. The computer-readable storage medium may be any available medium that can be accessed by a computer or include a data storage device such as a server or data center integrated with one or more available media. The available medium may be a magnetic medium (for example, a floppy disk, a hard disk, a magnetic tape), an optical medium (for example, a DVD), or a semiconductor medium (for example, a Solid State Disk (SSD)).

It should be noted that the relationship terms use here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise (s) a/an . . . " and "include(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiments of the apparatus, the electronic device and the storage medium are described briefly, since they are substantially similar to the embodiment of the method, and the related contents can refer to the description of the embodiment of the method. The embodiments described above are simply preferable embodiments of the present application, and are not intended to limit the scope of protection of the present application. Any modifications, alternatives, improvements, or the like within the spirit and principle of the present application shall be included within the scope of protection of the present application.

What is claimed is:

1. A method for storing video data in a cloud storage system, comprising:
   receiving to-be-stored video data;
   obtaining identification information of a storage object corresponding to the to-be-stored video data;
   determining the storage object corresponding to the to-be-stored video data, and a first data security level and a second data security level corresponding to the storage object based on the identification information; wherein, the first data security level is higher than the second data security level;
   for each frame in the to-be-stored video data, determining whether the frame is a key frame;
   when the frame is the key frame, determining a first erasure code policy based on the first data security level, and storing the frame into the determined storage object based on the first erasure code policy, wherein the first data security level is a number N1 of first original segments and a number M1 of first redundant segments; and
   when the frame is not the key frame, determining a second erasure code policy based on the second data security level, and storing the frame into the determined storage object based on the second erasure code policy, wherein the second data security level is a number N2 of second original segments and a number M2 of second redundant segments; and wherein the number M1 of first redundant segments is larger than the number M2 of second redundant segments.

2. An electronic device, comprising a processor, a communication interface, a memory, and a communication bus, wherein, the processor, the communication interface, and the memory communicate with each other through the communication bus,
   the memory is configured for storing a computer program;
   the processor is configured for executing the computer program stored on the memory to carry out the method according to claim 1.

3. A non-transitory computer-readable storage medium having stored therein a computer program, wherein the computer program is executed by a processor, so as to cause the processor to carry out the method according to claim 1.

4. The method of claim 1, wherein,
   storing the frame into the determined storage object based on the first erasure code policy comprises:
   for each key frame in the to-be-stored video data, dividing the key frame into N1 first original segments, and performing redundancy processing on the N1 first original segments to obtain M1 first redundant segments, and storing the N1 first original segments and the M1 first redundant segments into the determined storage object;
   storing the frame into the determined storage object based on the second erasure code policy comprises:
   for each non-key frame in the to-be-stored video data, dividing the non-key frame into N2 second original segments, and performing the redundancy processing on the N2 second original segments to obtain M2 second redundant segments, and storing the N2 second original segments and the M2 second redundant segments into the determined storage object.

5. The method of claim 4, wherein, before receiving the to-be-stored video data, the method further comprises:
   creating the storage object, wherein, the storage object comprises a plurality of disks, and the plurality of disks belong to one or more storage nodes;
   storing the N1 first original segments and the M1 first redundant segments into the determined storage object comprises:
   storing the N1 first original segments and the M1 first redundant segments into different disks in the determined storage object, respectively;
   storing the N2 second original segments and the M2 second redundant segments into the determined storage object comprises:
   storing the N2 second original segments and the M2 second redundant segments into different disks in the determined storage object, respectively.

6. The method of claim 5, wherein, after storing the N1 first original segments and the M1 first redundant segments into the different disks in the determined storage object, respectively, the method further comprises:
   recording index information corresponding to the frame, wherein the index information comprises information indicative of the storage object and the disk that store each of the first original segments and the first redundant segments;

after storing the N2 second original segments and the M2 second redundant segments into the different disks in the determined storage object, respectively, the method further comprises:

recording index information corresponding to the frame, wherein the index information comprises information indicative of the storage object and the disk that store each of the second original segment and the second redundant segments.

7. An apparatus for storing video data in a cloud storage system, comprising:

a video access module and a coding module, wherein, the video access module comprises: a data receiving sub-module, an information obtaining sub-module, a storage information determining sub-module, and a frame analyzing sub-module;

the data receiving sub-module is configured for receiving to-be-stored video data;

the information obtaining sub-module is configured for obtaining identification information of a storage object corresponding to the to-be-stored video data;

the storage information determining sub-module is configured for determining the storage object corresponding to the to-be-stored video data, and a first data security level and a second data security level corresponding to the storage object based on the identification information; wherein the first data security level is higher than the second data security level;

the frame analyzing sub-module is configured for, for each frame in the to-be-stored video data, determining whether the frame is a key frame;

the coding module is configured for:

when the frame is the key frame, determining a first erasure code policy based on the first data security level, and storing the frame into the determined storage object based on the first erasure code policy, wherein, the first data security level is a number N1 of first original segments and a number M1 of first redundant segments; and when the frame is not the key frame, determining a second erasure code policy based on the second data security level, and storing the frame into the determined storage object based on the second erasure code policy, wherein, the second data security level is a number N2 of second original segments and a number M2 of second redundant segments; the number M1 of first redundant segments is larger than the number M2 of second redundant segments.

8. The apparatus of claim 7, wherein, the coding module comprises:

a dividing sub-module configured for dividing each key frame in the to-be-stored video data into N1 first original segments, and dividing each non-key frame in the to-be-stored video data into N2 second original segments;

a redundancy processing sub-module configured for performing redundancy processing on the N1 first original segments to obtain M1 first redundant segments, and performing the redundancy processing on the N2 second original segments to obtain M2 second redundant segments;

a storage sub-module configured for storing the N1 first original segments and the M1 first redundant segments into the determined storage object, and storing the N2 second original segments and the M2 second redundant segments into the determined storage object.

9. The apparatus of claim 8, further comprising:

a storage object creating module configured for creating the storage object, wherein, the storage object comprises a plurality of disks, and the plurality of disks belong to one or more storage nodes;

the storage sub-module is further configured for:

storing the N1 first original segments and the M1 first redundant segments into different disks in the determined storage object, respectively, and storing the N2 second original segments and the M2 second redundant segments into different disks in the determined storage object, respectively.

10. The apparatus of claim 9, further comprising:

an index creating module configured for recording index information corresponding to each frame in the to-be-stored video data, wherein the index information comprises information indicative of the storage object and the disk that store each of the first original segments and the first redundant segments or information indicative of the storage object and the disk that store each of the second original segment and the second redundant segments.

* * * * *